(12) United States Patent
Schnoor et al.

(10) Patent No.: US 7,366,585 B2
(45) Date of Patent: Apr. 29, 2008

(54) METHOD AND APPARATUS FOR MOVING A HANDLING SYSTEM

(75) Inventors: Bernd Schnoor, Friedberf (DE); Rainer Bischoff, Ottobrunn (DE)

(73) Assignee: Kuka Roboter GmbH (DE)

( * ) Notice: Subject to any disclaimer, the term of this patent is extended or adjusted under 35 U.S.C. 154(b) by 241 days.

(21) Appl. No.: 10/446,014

(22) Filed: May 27, 2003

(65) Prior Publication Data

US 2004/0265110 A1 Dec. 30, 2004

(30) Foreign Application Priority Data

May 28, 2002 (DE) ................................. 102 23 670

(51) Int. Cl.
*B25J 9/00* (2006.01)
(52) U.S. Cl. ..................... 700/213; 414/735; 414/800; 414/806; 700/245; 901/2
(58) Field of Classification Search ................. 414/729, 414/755, 800, 806; 901/29, 2; 700/213, 700/245, 260, 262
See application file for complete search history.

(56) References Cited

U.S. PATENT DOCUMENTS

| | | | |
|---|---|---|---|
| 4,287,459 A * | 9/1981 | Dahlstrom | 318/568.14 |
| 4,370,091 A | 1/1983 | Gagliardi | |
| 4,537,557 A * | 8/1985 | Whitney | 414/735 |
| 4,739,241 A * | 4/1988 | Vachtsevanos et al. | 901/29 X |
| 4,906,907 A | 3/1990 | Tsuchihashi et al. | |
| 4,928,047 A | 5/1990 | Arai et al. | |
| 5,023,533 A * | 6/1991 | Ishikawa et al. | 901/29 X |
| 6,002,971 A * | 12/1999 | Lucas | 700/213 X |
| 6,226,565 B1 | 5/2001 | Elfving et al. | |

FOREIGN PATENT DOCUMENTS

| | | |
|---|---|---|
| DE | 30 26 273 | 2/1981 |
| DE | 33 19 169 A1 | 12/1983 |
| DE | 37 07 450 A1 | 9/1988 |
| DE | 3810691 A1 | 10/1988 |
| DE | 42 38 795 A1 | 7/1993 |
| DE | 44 41 240 | 5/1996 |
| DE | 199 07 989 A1 | 10/1999 |
| DE | 298 13 589 U1 | 1/2000 |
| DE | 299 00 899 | 8/2000 |
| DE | 100 16 697 A1 | 10/2001 |
| EP | 0 333 876 | 9/1989 |
| JP | 60003714 | 1/1985 |
| JP | 60077210 | 5/1985 |
| JP | 1228783 | 9/1989 |
| JP | 02131892 | 5/1990 |
| JP | 05057648 | 3/1993 |
| JP | 05057650 | 3/1993 |
| WO | WO 98/42482 | 10/1998 |

* cited by examiner

*Primary Examiner*—Donald Underwood
(74) *Attorney, Agent, or Firm*—Schiff Hardin LLP

(57) ABSTRACT

A method for moving a multi-axis or multi-axle handling system, particularly for orienting a hand of an industrial robot, with a gripping tool connected to a hand is characterized in that the movement is performed in such a way that movement-dependent moments on an article held by the gripping tool are largely eliminated and that essentially only normal forces act between the article and the gripping tool. An apparatus according to the invention is used for performing the method. This permits a safe and speed-optimized movement of handling articles, particularly during palletizing and commissioning, which leads to corresponding economic cost advantages.

9 Claims, 8 Drawing Sheets

METHOD AND APPARATUS FOR MOVING A HANDLING SYSTEM

FIELD OF THE INVENTION

The invention relates to a method for moving a multi-axle or multi-axis handling system with a plurality of drive and control devices for moving the axes, as well as a gripping tool connected to a hand of the handling system and to a handling system with a plurality of movable axes and drive and control devices associated therewith, together with at least one gripping tool connected to a hand of the handling system.

BACKGROUND OF THE INVENTION

The use of multi-axis handling systems, particularly in the form of industrial robots, in conjunction with specific handling activities is e.g. known from DE 299 00 899 U1. In the case of a storage system for an article distribution centre described therein robots are used as separating devices, so that in the case of a reduced number of personnel and reduced energy use and ergonomically unfavourable ambient conditions, it is possible to ensure a time-shortened redistribution and commissioning of articles supplied in large quantities to smaller and differently packed loads or batches.

The use of industrial robots, more particularly at the end of production lines, is also known and widespread. As a rule for this purpose use is made of specific palletizing robots with four active and a fifth passive axis, where the latter is carried along by a parallelogram structure in such a way that the hand axis of the palletizing robot is always vertically oriented, i.e. the hand flange used for fixing a gripping tool is always oriented parallel to the base plane. In addition, so-called portal robots with three linear or rotary moved axes or axles are known.

The palletizing or commissioning process fundamentally takes place in accordance with a fixed diagram, no matter whether this involves the taking up of an article using a suitable gripping tool and the subsequent transportation or the setting down of the article on a pallet. The article is taken up by means of the gripping tool in a clearly defined position and usually using a conveyor and is then briefly raised by e.g. 1 to 2 cm initially with a limited speed and acceleration. This is followed by an optimum rapid movement to a position above the deposition location on a target pallet, the taking up position and the precise deposition location generally being predetermined by a specific movement algorithm, e.g. a palletizing algorithm, i.e. using corresponding software. At the end of the movement the article is slowly set down at the target location, e.g. on the pallet. The entire, above-described process can take place with multiple or single grip and is not restricted to palletizing or commissioning processes and in general terms constitutes part of numerous handling processes.

It is fundamentally desirable to operate a handling system, e.g. a robot, with maximum acceleration and speed so as to achieve very short cycle times and optimize the economic efficiency of the process. However, in general such rapid movements generally have a lateral component of motion parallel to the ground, as is particularly immediately apparent during palletizing. With a high acceleration in the lateral direction it is a consequence that correspondingly high inertia forces act on the article to be handled in the opposite direction, which in practice in the case of palletizing robots with a vertical hand axis gives rise to significant problems.

The inertia forces generally act in the centre of gravity of the article moved, whereas the holding or accelerating forces resulting from the gripping tool, which is generally constructed as a suction and/or clamping gripper and maintains the article substantially on its top surface, correspondingly act in an area outside the centre of gravity of the article moved. The occurrence of such a force couple, holding and accelerating forces on the one hand and inertia forces on the other, gives rise to a torque perpendicular to the movement direction, so that on its front side with respect to the movement direction the article is subject to a force acting downwards in addition to the weight, i.e. generally away from the gripping tool.

Where the greatest tensile forces occur between the gripping tool and the article, i.e. directly at the leading edge, the maximum tearing off or away risk occurs if the superimposing forces (weight of the article and downwardly directed tensile force through the torque resulting from acceleration and inertia) become greater than the holding force of the gripping tool. It is sufficient for this state to arise solely on one edge of the gripping tool in order to completely lose the article. This behaviour is even more critical if the article, which is generally a parallelepipedic body, is accelerated in the direction of the article surface diagonals.

In the case of single type palletizing, e.g. at the end of production lines, assistance can be provided in that on the sides of the gripping tool there is a provision of additional flaps, e.g. with cylinders operated pneumatically, which additionally retain the article counter to the action of harmful force and moment effects.

On commissioning, i.e. in the case of mixed type palletizing, this principle does not apply, because here for pallet stability reasons the palletizing process begins at the pallet sides. In the case of pallet instability this ensures that the pallet load always slides towards the middle of the pallet and not towards the outside. However, such a procedure also leads to individual articles subsequently having to be buried in in part narrow "gaps" on the pallet. However, the gripping tool must not project over the edges of the article, so that known commissioning methods can only be performed with a limited displacement speed in order to as far as possible prevent the loss of articles.

DE 44 41 240 C1 discloses a method and an apparatus with the aid of which a movement of an article on a preprogrammed path or track is made possible. This is brought about in that a compensating unit constantly initiates a system-characterizing motion equation and a compensation quantity is determined, which directly acts in the form of a control variable on the system. This permits a more precise and faster movement of the article along the predetermined path. As a result the movement of articles on a programmed path takes place without jerks and rapidly. However, it is a disadvantage of such an article movement control that no provisions are made for optimizing the path behaviour with respect to a uniform force distribution of a connection between the gripping tool and the article moved. DE 44 41 240 C1 is admittedly directed at achieving the greatest possible force-free movement of an article, but factors out the fundamentally necessary acceleration phases at the start and finish of the movement, which are particularly problematical when using industrial robots for moving articles.

Whilst avoiding the aforementioned disadvantages, the problem of the invention is to provide a method and an apparatus making it possible with simple design means to time-shorten the handling process associated with the movement of articles, particularly during palletizing or commissioning, whilst providing a maximum transportation safety with respect to the articles moved.

SUMMARY OF THE INVENTION

In the case of a method of the aforementioned type, the invention solves this problem in that the movement is performed in such a way that movement-dependent moments on an article held by the gripping tool are largely eliminated and that essentially only normal forces act between the article and the gripping tool.

For solving the aforementioned set problem in the case of an apparatus of the aforementioned type, the invention provides for the movement to be performable in such a way that movement-dependent moments on an article held by the gripping tool are largely eliminatable and between the article and the gripping tool only essentially normal forces act.

In the sense of the invention normal forces are those forces acting on the gripping tool and the article perpendicular to the contact surface between gripping tool and moved article.

Thus and whilst taking account of the weight and inertia forces of the article to be handled, essentially no undesired forces and moments act on the gripping tool and article, which could lead to the dropping or position shift of the article, so that the latter can be displaced in an optimum rapid manner and with a broad spectrum of handling activities shorter cycle times can be achieved, which in turn leads to economic advantages.

According to a preferred development of the method according to the invention predetermined axes of the handling system are at least temporarily controlled for compensating forces and moments. Therefore an active compensation of undesired forces and moments is possible.

Fundamentally, e.g. during commissioning, it is to be assumed that the package dimensions and weight of each individual article are known. These informations are stored in an article distribution centre in the store management system and can be polled when necessary by the commissioning systems. It is also to be assumed that the centre of gravity of the individual articles essentially coincides with the geometrical centre of the article (minor differences can arise e.g. in the case of bottles with a thin, long neck packed in cardboard boxes).

As soon as the robot control is aware of the starting and end points and optionally specific hand orientations of a movement necessary at these points, all the further kinematic informations are fundamentally available (path acceleration and speed vectors). The robot control is then in a position to perform a path planning with the available data concerning the article to be handled and as a result the forces which occur and which act between the gripping tool and the article are largely normal forces. Therefore the resulting force acts substantially orthogonally to the gripping surface. As an absolutely uniform distribution is unachievable in practice, the path behaviour is optimized with respect to a uniform force distribution.

If the weight and inertia forces and the torques of the article to be handled resulting from these forces are unknown, according to a further development of the invention forces and moments exerted by the article on the gripping tool are measured by sensors located on the gripping tool and/or between the hand and gripping tool. For this purpose there is preferably at least one sensor for measuring forces and moments between the hand and gripping tool. According to another preferred development of the invention, sensors for measuring forces and moments are provided on the gripping tool. With a surface-covering sensor arrangement for the gripping tool it is possible to measure on the latter an actual force profile. Through the provision of such sensors it is possible to determine an optimum regulated path curve from measured data obtained during the displacement movement of the handling system and to cover not merely a predetermined path curve so as to permit a flexible adaptation to circumstances of the handling process.

According to a further development of the invention, the gripping tool is held in an at least partially freely movable manner on the handling equipment and this can initially take place in such a way that axes of the handling system are substantially switched in freely movable manner, at least phasewise during article movement.

In place of the constant, active control of all the axes of a handling system for compensation purposes making it possible with the hitherto described developments of the invention to move the article to be handled on an optimum path for minimizing the moments acting on the gripping tool, individual axes of the handling system, particularly terminal axes, such as e.g. the hand joint axes of an industrial robot, are smoothly switched at certain times in this development, i.e. they are substantially freely movable under the influence of external forces, so that the moments occurring around the said axes automatically orient the article to be moved in an at least partial manner based on the laws of mechanics in such a way that essentially only normal forces act between gripping tool and article. An active compensation is then only necessary with respect to the occurring friction losses, etc., which counteract a complete orientation.

In an extremely preferred development of the invention from the tilt angles of the freely movably switched axes characteristics of the moved article, particularly a weight and/or a mass distribution and/or moments of inertia and/or optionally further characteristics are determined. In this way, e.g. for planned deceleration, i.e. a deceleration operation, where essentially only normal forces act between the gripping tool and the article, a previously accelerated article and for positioning and planned deposition of the transported article, the initially smoothly switched axes are again controlled in a predetermined direction. Thus, it is e.g. possible from the tilt angles of individual axes to draw conclusions during the initial acceleration and displacement movement concerning the article weight and consequently calculate an optimum deceleration path. Compared with other developments of the invention, this variant has the additional advantage that the weight and moments of inertia of the article do not have to be known prior to the handling process and there is no need for additional sensors over and beyond those generally already present in the axes of the handling system.

For the alternative, free holding of the gripping tool, according to a further development of the invention concerning the free switching of axes, between the hand and gripping tool is provided a freely movable joint. The controllable (additional) axes of the handling system necessary for determining the weight and moments of inertia of the article and used for planned deceleration with respect to the above-described developments of the invention, are supplemented or possibly replaced by the freely movable joint in the presently described development of the invention. Through the reduction with regards to the handling system by two active axes, e.g. from six to only four active axes in the case of a standard industrial robot, this can on the one hand lead to a significant cost saving and on the other, it is looked upon as advantageous in a development with a freely movable joint in place of a known rigid connection between hand and gripping tool, that the article to be handled can be in part independently oriented without complicated path planning during the displacement process in accordance with the laws of mechanics in such a way that essentially only normal forces act on the gripping tool and article, provided that the freely movable joint is constructed in a sufficiently smooth manner and no excessive frictional forces arise. In such a development the freely movable joint is preferably constructed as a ball or cardan joint. According to other developments of the invention, the freely movable joint is constructed as an optionally at least partly elastic cable connection.

According to an extremely preferred development of the invention, the freely movable joint has at least one sensor for determining a weight and/or a mass distribution and/or moments of inertia and/or optionally further characteristics of the moved article.

In conjunction with a construction of the connection between the hand of the handling system and the gripping tool as a freely movable joint in general vibrations or oscillations occur, which is detrimental with regards to a precise article positioning.

According to the invention, on the basis of known or measured weight and inertia moments of the article a path planning algorithm for minimizing oscillations of the article to be moved, particularly during the deceleration process, determines the path parameters and the active axes of the handling system are correspondingly controlled. For determining the weight and inertia moments of the article, according to a preferred development sensors in or on the freely movable joint determine the necessary parameters for a path planning or regulation. In a preferred development, for this purpose there is a combination of a rigid force-moment sensor and a freely movable joint without sensors fixed thereto. The sensor can remain restricted to the determination of the resulting force vector, because through the freely movable joint between the hand flange and gripping tool moments can no longer arise, which in the case of known handling systems can lead to a tearing away of the article to be handled.

Alternatively or additionally it can be provided that the passive joint is locked prior to the setting down of the transported article, optionally also on taking up the same, i.e. is held in a fixed, predetermined position. After taking up a new article this locking effect is unlocked again and the joint is released. In a preferred apparatus development, a corresponding locking and unlocking device is provided. In another preferred development, the movement of the passive joint is damped and for this purpose damping or antivibrating elements are provided.

BRIEF DESCRIPTION OF THE DRAWINGS

Embodiments of the invention are described in greater detail hereinafter relative to the attached drawings, wherein show.

DETAILED DESCRIPTION OF THE DRAWINGS

Figure 1A:
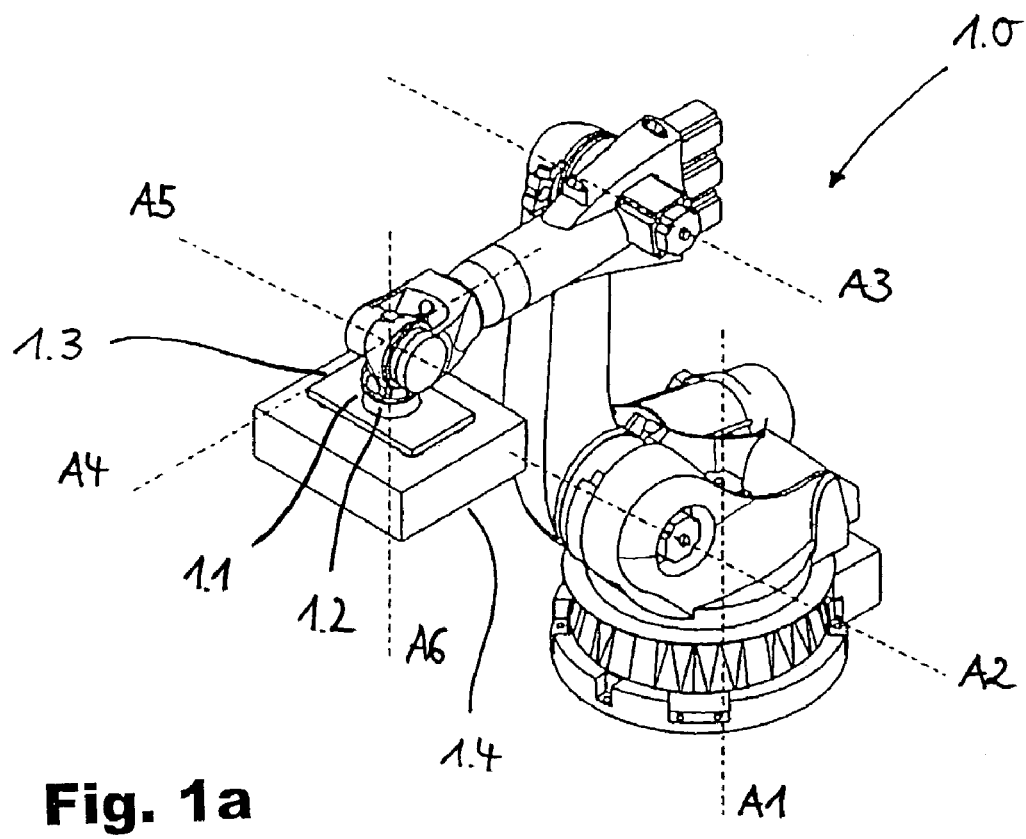
FIG. 1a A perspective view of a six-axis or axle industrial robot with gripping tool and article to be handled.

FIG. 1a shows a handling system 1.0 in the form of a typical six axis or axle robot with kinematics for movements in six degrees of freedom. To this end the represented handling system 1.0 has six active axes A1 to A6. A hand 1.1 with hand flange 1.2 carries a gripping tool 1.3 in the form of a suction gripper with which the handling system 1.0 is in a position to lift an article 1.4 and transport it in space. The six axis kinematics permits quasi-random poses (designating positions and orientation) of the hand 1.1, so that complex, adapted motion sequences are possible.

Figure 1B:
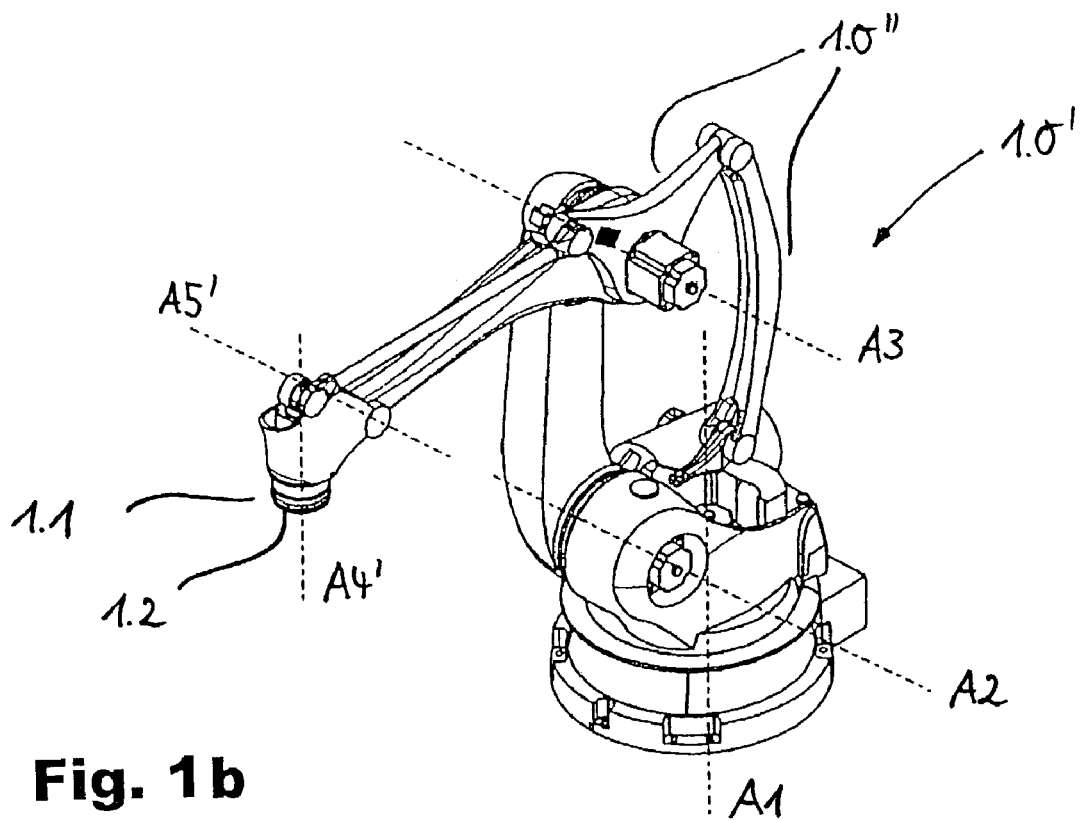
FIG. 1b A perspective view of a palletizing robot with four active and a fifth passive axis.

The typical four axis or axle palletizing robot 1.0' shown in FIG. 1b has four active axes A1-A3, A4', together with a fifth passive axis A5' and is consequently constructed for implementing movements with four degrees of freedom. With such kinematics the hand axis A4', which passes through the hand 1.1 and hand flange 1.2, is fundamentally vertically oriented as a result of a parallelogram structure 1.0" of the palletizing robot 1.0', i.e. a fixing surface of the hand flange 1.2 is parallel to the ground or base plane. As a result of the vertical positioning of the hand axis A4', such palletizing robots 1.0' suffer from the above-described advantages in the case of (rapid) lateral, horizontal movements of articles 1.4 to be handled.

Figure 1C:
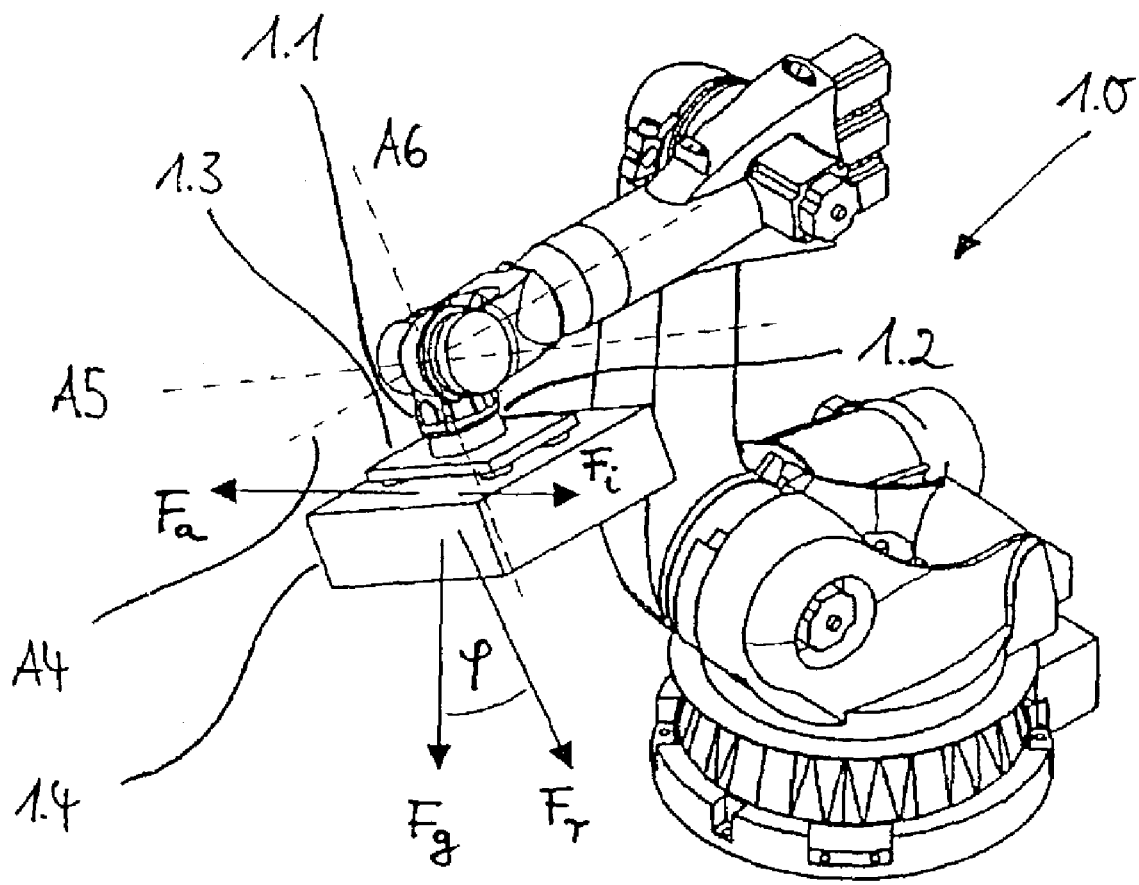
FIG. 1c A perspective view of a six-axis industrial robot with gripping tool and handling article, whose axes are controlled according to the method of the invention for obtaining normal forces.

The inventive solution of the set problem provides for the axes of a multi-axis handling system to be moved in such a way that the moments on the article to be handled caused by the movement are largely eliminated and essentially only normal forces act between article and gripping tool. For this purpose it is necessary in the case of known robot kinematics with four, six or some other number of active axes to control and/or construct individual axes in such a way, namely at least temporarily largely freely movable, optionally damped, that the hand, gripping tool and article take up a pose in space useful for the desired force action at any time during the movement to be performed. A decisive parameter is the setting angle $\psi$, i.e. the angle of inclination of the hand axis A6, A4' relative to the vertical. With six axis robot kinematics according to FIG. 1a, a setting angle $\psi$, where the force $F_r$ during the movement of the article 1.4 almost completely acts as a normal force, can be implemented according to FIG. 1c solely by a path planning adapted to the centre of gravity position and weight of the article 1.4 to be handled. According to FIG. 1c, the path planning for axes A4, A5 and A6 must be correspondingly adopted. The setting angle $\psi$ mainly has to compensate the effects caused by the mass moment of inertia of the article 1.4 to be handled. An air friction of the article 1.4 and other friction effects pass into the background and can generally be ignored. The forces shown in FIG. 1c are explained further relative to FIG. 3.

With four axis kinematics according to FIG. 1b, in order to implement a suitably adapted setting angle ψ, passive or active elements must be integrated into the gripping tool 1.3.

Figure 2A:
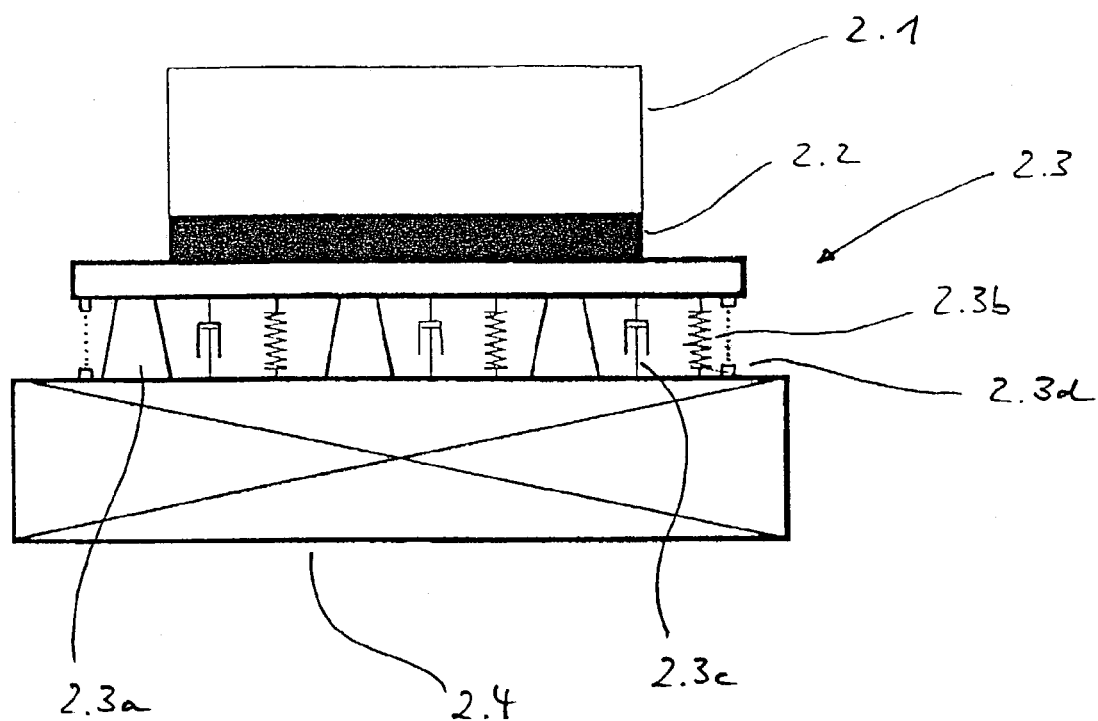
FIG. 2a A diagrammatic detail view of a gripping tool with sensors and an article to be handled.

A corresponding gripping tool 2.3 is diagrammatically shown in FIG. 2a. It is connected by means of hand flange 2.2 to hand 2.1 of the handling system. For holding the article 2.4 to be handled, the gripping tool 2.3 has a plurality of suction cups 2.3a and further elements in the form of springs 2.3b and antivibrators 2.3c. A distance measuring unit 2.3d is also provided on the gripping tool 2.3.

The individual elements 2.3a to 2.3c can be constructed as purely passive or as actively controllable elements, so that when using such a gripping tool with four axis kinematics, it is possible to implement an adapted setting angle ψ through the gripping tool 2.3.

By means of the distance measuring unit 2.3d, shown here in the form of infrared sensors, an undesired sloping position of the article 2.4 can be measured and represents a measure of the inertia force $F_i$, which is particularly important if the corresponding characteristics of the article 2.4 are not a priori known.

Figure 2B:
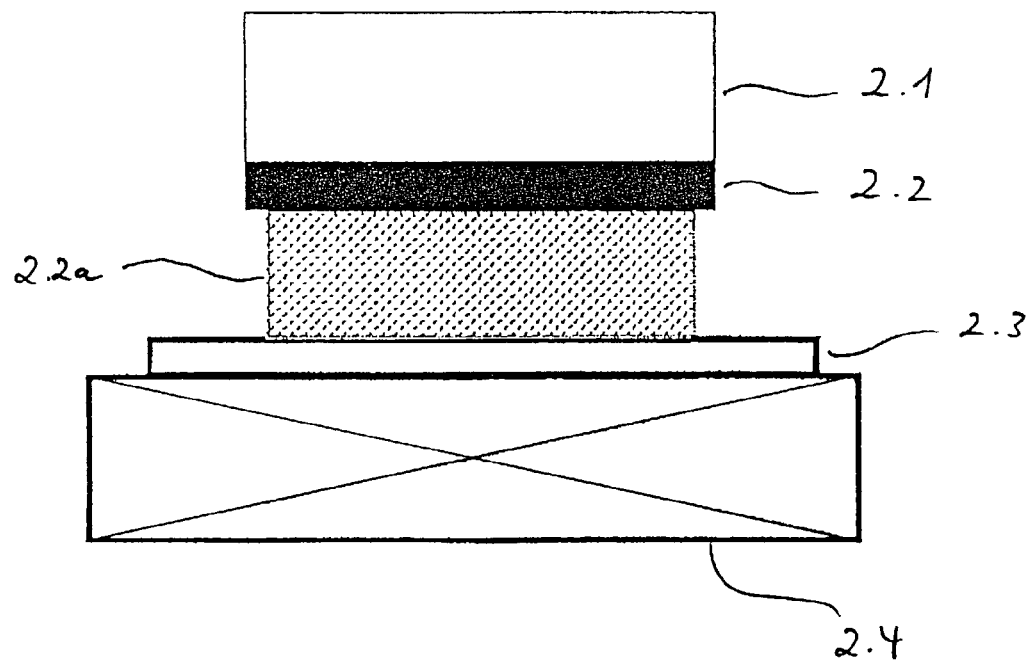
FIG. 2b A diagrammatic view of a development with force/moment sensor positioned between the hand flange and gripping tool.

Alternatively and in accordance with FIG. 2b, it is possible to provide a force/moment/moment sensor 2.2a between hand flange 2.2 and gripping tool 2.3 with which it is also possible to determine the inertia forces acting on the article 2.4.

Figure 3:
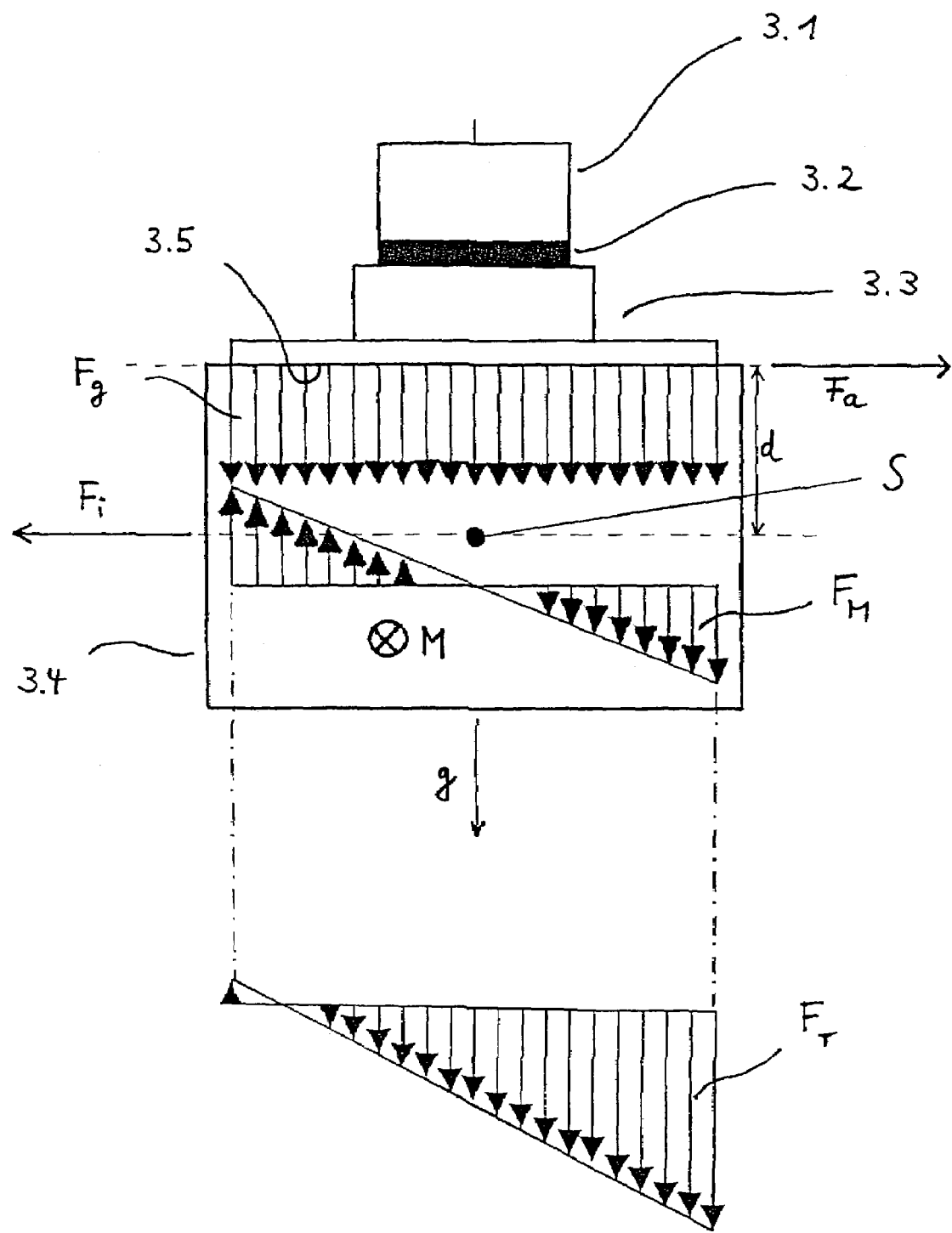
FIG. 3 A diagrammatic representation of the forces and moments more particularly arising in the case of lateral acceleration of an article to be handled.

FIG. 3 diagrammatically shows the forces and moments occurring as a result of a lateral acceleration of an article. A gripping tool 3.3 in the form of a vacuum suction gripper is fixed to a hand flange 3.2 of a hand 3.1 of a handling system not shown in this representation. The taking up of an article 3.4 in this case takes place by the suction of the gripping tool 3.3 on the top 3.5 of the article 3.4. The mass centre S of the article 3.4 is at a distance d below the top 3.5 of the article 3.4.

If the article 3.4 is initially vertically raised by the handling system, the weight $F_g$ of the article 3.4 caused by acceleration due to gravity g acts on the gripping tool 3.3 and is distributed over the gripping surface thereof, which in the case of the embodiment shown essentially corresponds to the surface of the top 3.5 of the article 3.4. If in the case of a forcibly retained orientation, the article 3.4 is now laterally accelerated by a force $F_a$, due to the inertia force $F_i$ acting in the centre of gravity S of the article 3.4 and whose quantity corresponds to the accelerating force $F_a$, but is oriented in opposition thereto, a force couple occurs which as a result of the finite spacing d between their action lines (shown in broken line form in FIG. 3) brings about a torque M. The torque M is oriented perpendicular to the sheet plane and produces an additional force component $F_M$, which increase the force $F_g$ from the centre of gravity S of the article 3.4 in the direction of movement and as is qualitatively shown in FIG. 3, whereas an optionally complete compensation of the weight $F_g$ occurs counter to the movement direction. As the additional force component $F_M$ increases with spacing from the centre of gravity S in substantially amount-proportional manner to the amount of the accelerating force $F_a$, in the vicinity of the leading edge of the gripping tool 3.3 in the movement direction a tearing away can occur and therefore a complete loss of the article 3.4 to be handled. The profile of the resulting force $F_r$, the vector sum of $F_g$ and $F_M$, is shown in the lower part of FIG. 3.

Figure 4:
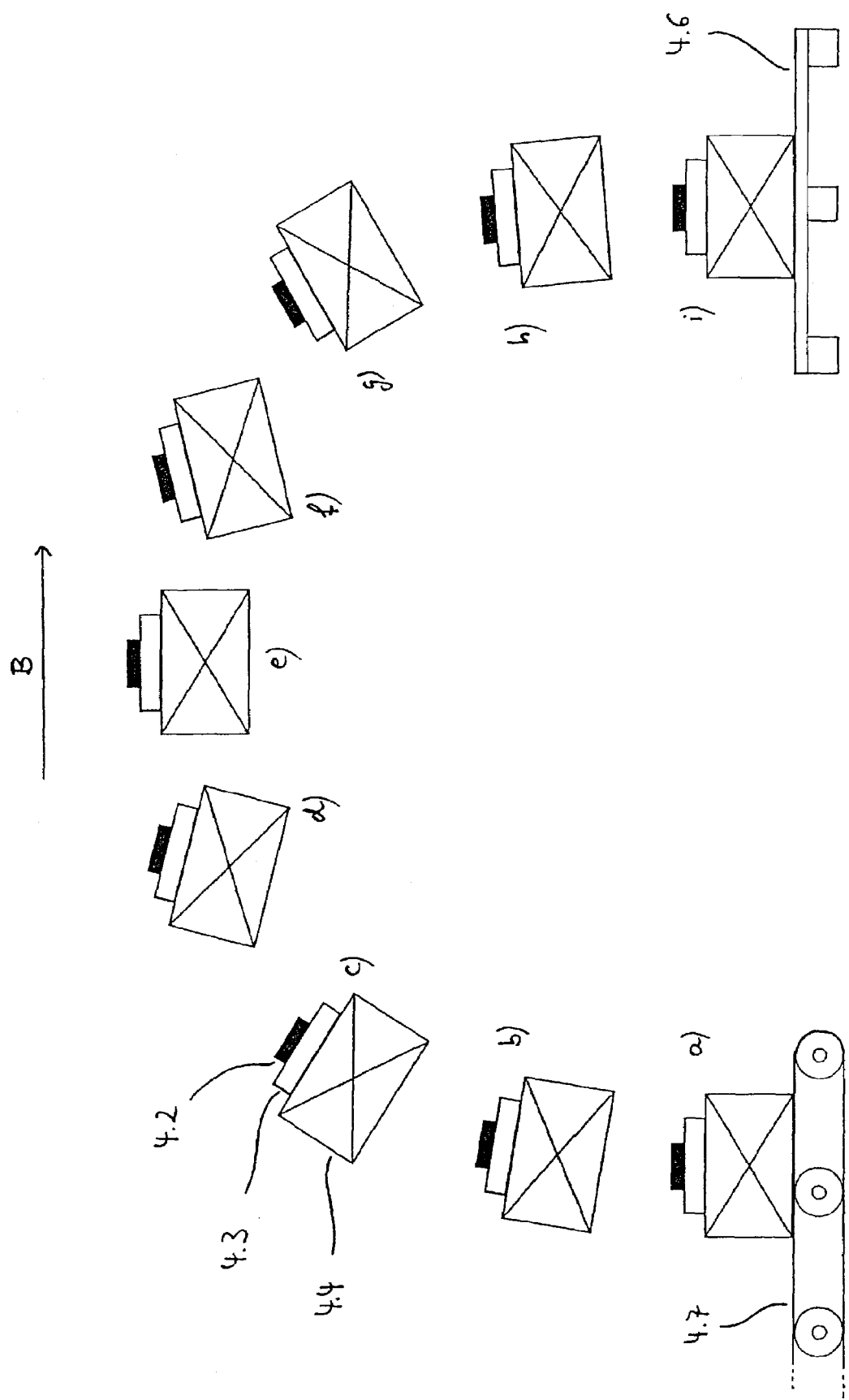
FIG. 4 A diagrammatic representation of a handling process.

In order to ensure that throughout the movement of the article 3.4 to be handled, no such moments occur or they are at least reduced and the resulting forces $F_r$ acting between the gripping tool 3.3 and article 3.4 are essentially normal forces, according to a preferred embodiment of the invention shown in FIG. 4, by active control of individual axes of the handling system the path behaviour with respect to a uniform force distribution is optimized. According to FIG. 4 there is a movement of an article 4.4 to be handled in the direction of the arrow B and said article 4.4 is held by a gripping tool 4.3 fixed to a hand flange 4.2 of a not shown handling system. FIG. 4 in exemplified manner illustrates a palletizing process in which the article 4.4 is deposited on a pallet 4.6. The letters a to i designate time-succeeding steps of the handling process.

The article 4.4 located at the first position, e.g. a conveying means 4.7 at the end of a production line, is initially briefly vertically raised at a. Subsequently at b there is a lateral acceleration, as shown in FIG. 3. For compensating the torque M shown, the article 4.4 together with the gripping tool 4.3 and hand flange 4.2 is slightly laterally tilted by the active control of individual axes of the handling equipment. The lateral acceleration is greatest at c. Correspondingly the position of individual axes of the handling equipment is adapted for corresponding compensation of the forces and moments which occur. Subsequently there is a reduction of the lateral acceleration d and at e the article 4.4 is displaced with a high, constant speed. At f, g and h there is a negative acceleration caused by the deceleration process and which is compensated by a corresponding opposing control (cf. b-d) of individual axes of the handling equipment. Finally, the article 4.4 is slowly deposited on the pallet 4.6 (i).

In the case of smoothly switched axes of the handling equipment or in the case of the provision of a smooth, freely movable joint between the hand flange 4.2 and gripping tool 4.3, in accordance with the laws of mechanics, the gripping tool 4.3 and article 4.4 in part automatically assume a position corresponding to FIG. 4, so that in this case harmful forces and torques are to a certain extent automatically compensated.

Figure 5A:
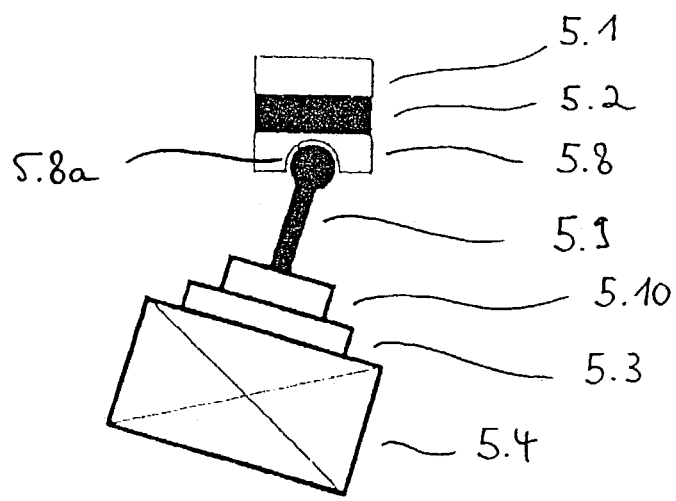
FIG. 5 A diagrammatic representation of a handling system with freely movable connection between hand and gripping tool.
Figure 5B:
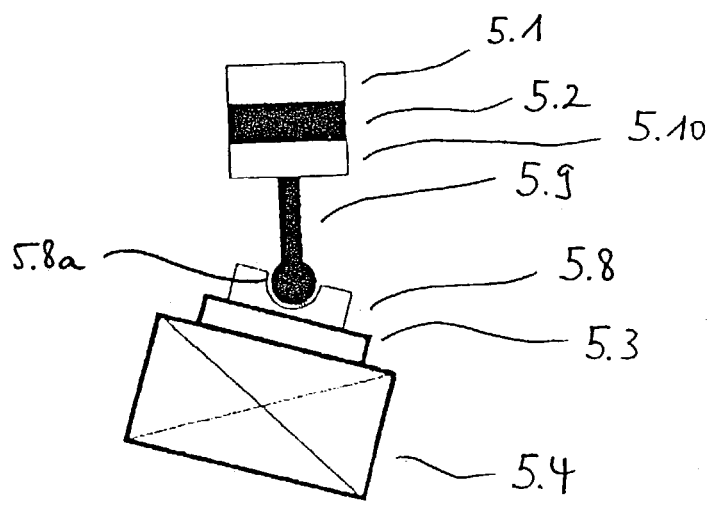
Figure 5C:
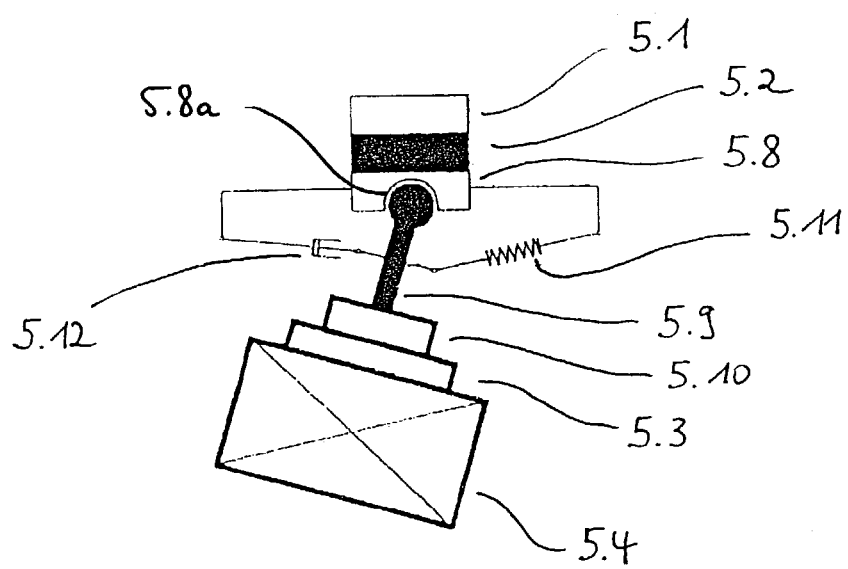

FIGS. 5a to 5c are diagrammatic representations of different developments of the handling system according to the invention with a freely movable connection between hand and gripping tool.

In the case of FIG. 5a, the hand flange 5.2 connected to the hand 5.1 has a connecting element 5.8 with ball and socket joints 5.8a or the like, on which is suspended in freely movable manner the article 5.4 by means of a suspension part 5.9, such as a cable, a rod, a cardan shaft or the like. To the suspension part 5.9 is connected a further connecting element 5.10 by means of which the suspension part 5.9 is fixed to the gripping tool 5.3.

In the case of FIG. 5b the connecting element 5.8 on gripping tool 5.3 has the ball and socket joint 5.8 or the like for the freely movable suspension of the article 5.4 on a suspension part 5.9 corresponding to FIG. 5a.

In the case of FIG. 5c, which largely corresponds to FIG. 5a, additionally in conjunction with the connecting element 5.8 and suspension part 5.9 there are variable spring elements 5.11 and antivibration elements 5.12, which can also be used for a planned influencing of the movement path of the article 5.4 to be handled. This can e.g. take place by exciting and damping oscillations up to a complete locking of the suspension part 5.9. Additionally it is possible to integrate into the elements 5.11, 5.12 a path measuring device (not shown), in order to be able to determine in this way possibly unknown characteristics of the article 5.4 to be handled. The same applies with respect to the ball and socket joint 5.8a provided on the connecting element 5.8, which can be constructed for path or track measurement according to the trackball principle.

Figure 6:
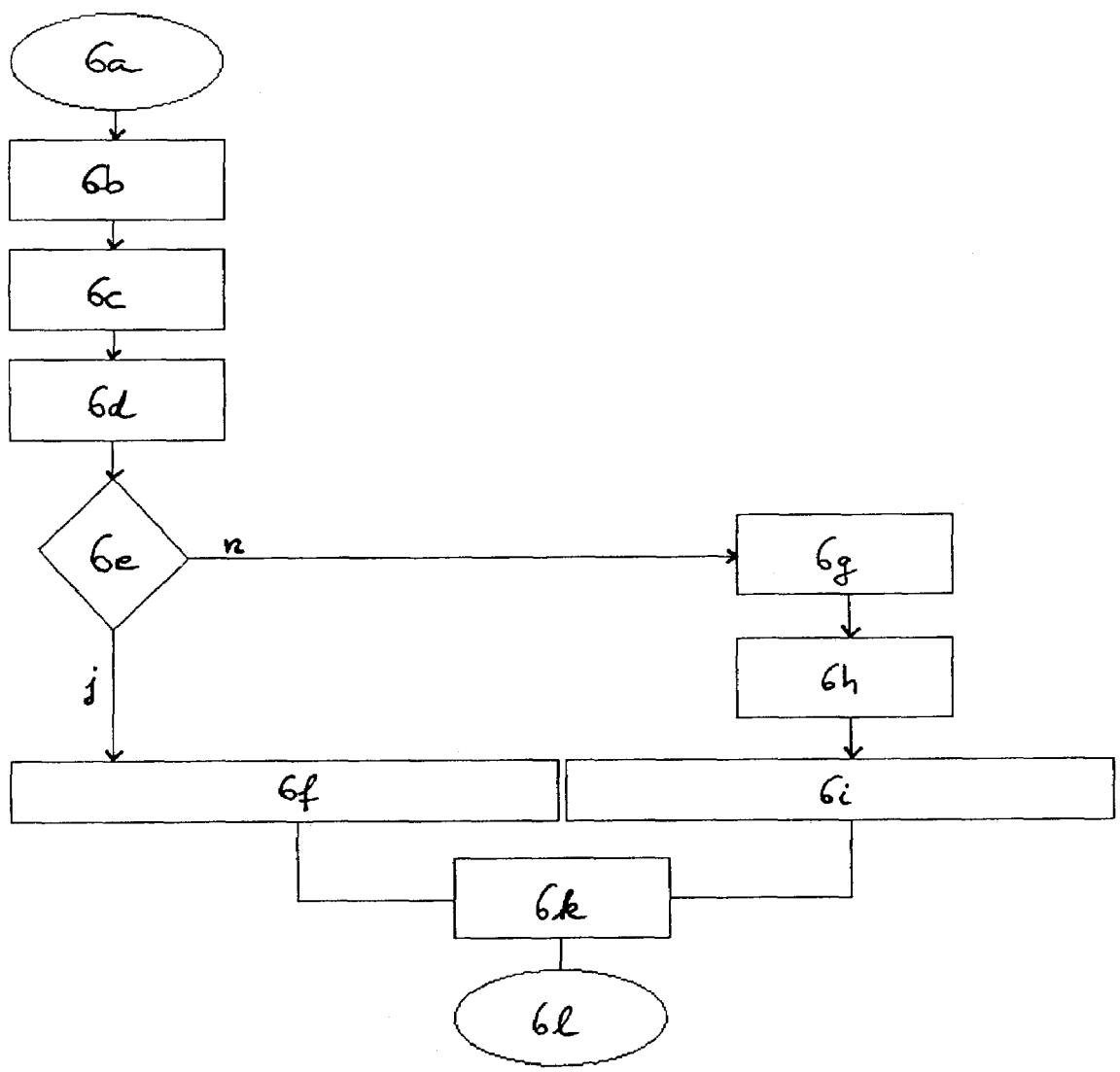
FIG. 6 A flow chart of the movement control according to the invention.

The flow chart of FIG. 6 shows the most important steps of the movement procedure according to the invention. What is shown is the movement from a starting point or pose $P_S$ to an end point or pose $P_E$. The movement from $P_E$ back to a (new) starting point $P_S'$ takes place correspondingly, but typically no object is moved on the path to $P_S'$. Thus, on the return path all parameters for a path planning or regulation should be known, because they are internal parameters of the handling system.

Following the start of movement 6a, at 6b the starting pose $P_S$ and the finishing pose $P_E$ are calculated. Then at 6c movement takes place to $P_S$, where the handling article is gripped at 6d. Subsequently a case differentiation 6e is performed, depending on whether or not the characteristics of the article to be handled are known. In the case of known characteristics (j), a planning of the overall movement from $P_S$ to $P_E$ is possible 6f. Otherwise (n) at 6g a first partial movement is predetermined in such a way that specific characteristics of the article to be handled, i.e. its inertia moment can be determined during article movement along the partial trajectory. This e.g. takes place by means of external sensors, which can according to FIG. 2 be directly integrated into the gripping tool taking up the article. It is possible to calculate or at least estimate from the sensor values at 6h the characteristics of the article to be handled and for this purpose it is also possible to use internal sensor values, such as e.g. the measurement of a motor current. In this way a planning of the remaining second part of the path movement is possible at 6i.

The planning of the overall movement 6f or partial movement 6i in both cases takes place with respect to $P_E$ in such a way that between the gripping tool and article to be handled essentially only normal forces act and an additional path regulation during the movement is possible for the case that the gripping tool according to FIG. 2 is equipped with suitable (external) sensors. Account must be taken of any constraints involved, such as the speed, maximum holding force of the gripping tool, obstacles in space, etc.

On reaching the end pose $P_E$, the article to be handled is deposited at 6k by opening the gripping tool and this ends the movement described 6l.

Fundamentally in the case of path planning in 6f or 6i, a distinction must be made between the following embodiments of the handling system according to the invention:

a) In the case of known four axis palletizing robots (cf. FIG. 16b), according to FIG. 2 gripping tools with sensors can be provided. By means of these external sensors it is possible in conjunction with the internal robot sensors to determine inertia forces and moments of the article to be handled and with the aid of the sensors a path regulation can be effected in such a way that despite the harmful forces and moments occurring on the gripping tool the article being handled is not torn away. This can e.g. take place in that the movement speed is always kept below a critical limit.

b) With a known four axis palletizing robot, which according to FIG. 5 has a self-orienting gripping tool or a self-orienting article, for movement control no further, specific (external) sensors are needed. Path planning takes place without sensors in such a way that a suitable acceleration and deceleration movement and/or, in the case of FIG. 5c, a suitable locking time are calculated, so that the article does not tear away from the gripping tool during the movement.

c) With robots having six axis kinematics, the article or gripping tool can be firmly fixed to the robot hand flange. According to FIG. 5 it is then possible to freely movably switch the hand axis, so that free oscillation of the article or gripping tool and also a locking in accordance with FIG. 5c can take place. No special sensors have to be provided in this connection, because path planning takes place without sensors in such a way that as described under b) a suitable acceleration and deceleration movement and/or a suitable locking point are calculated.

d) As a restriction with respect to c), it is also possible to perform path planning in the case of actively switched hand axis in such a way that it is controlled together with the remaining axes of the robots so that with respect to the forces acting on the gripping tool an optimum path is covered. The setting angle $\psi$ of the corresponding parameters is as shown in FIG. 7.

Figure 7:
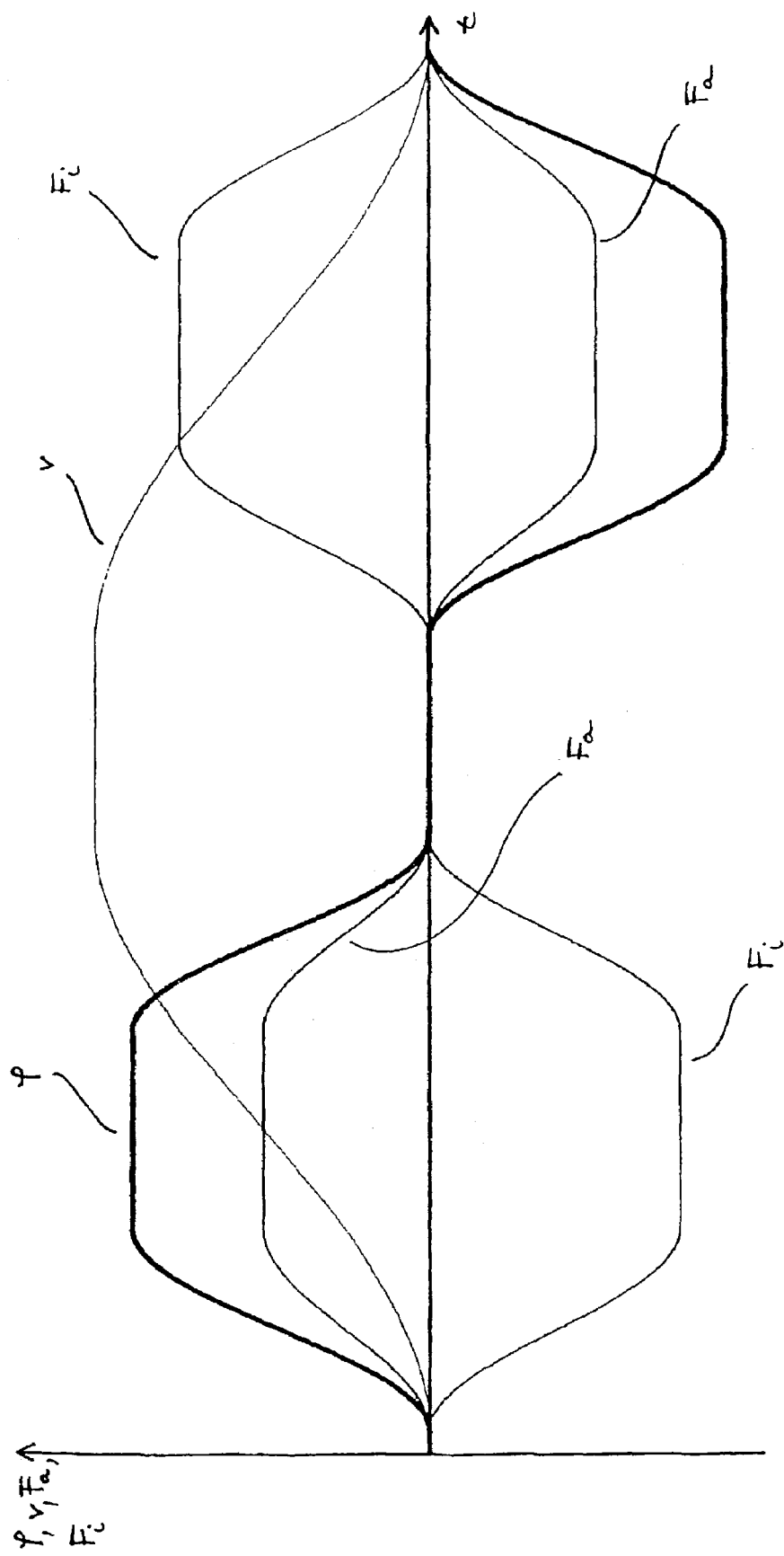
FIG. 7 A qualitative representation of the most important factors during a movement of a multi-axis handling system according to the invention.

FIG. 7 shows the qualitative course of the setting angle $\psi$ of the gripping tool with respect to the vertical, the path speed v, the path acceleration force $F_a$ and the inertia force $F_i$ as a function of time t during an inventive path movement of a multi-axis handling system.

At the start of the movement (left-hand half of the drawing) there is a time-variable, positive acceleration force $F_a$, which accelerates the article to be handled from an initial speed v=0 to a maximum speed. Correspondingly during the end phase of the movement (right-hand part of the drawing) there is a corresponding deceleration $-F_a$. In the central part of the movement it is acceleration-free ($F_a$=0) and takes place with a constant speed v. During the acceleration phases at the start and finish of the movement there are inertia forces $F_i$ opposing the particular acceleration force $F_a$ and, in accordance with FIG. 3, cause harmful moments on the gripping tool and can lead to a tearing away of the article. To prevent this and within the scope of the method according to the invention the setting angle $\psi$, i.e. the inclination angle of the hand axis A6, A4' is adapted to the given path parameters, which is achievable by active control of specific axes A4-A6 of the handling system or by freely movable construction or switching of the hand axis A6, A4'. This ensures that essentially only normal forces act on the gripping tool as a result of the adapted setting angle $\psi$.

The invention claimed is:

1. A method for transferring at least one article from a starting point to an end point using a multi-axis robot having a holding tool and being controllable by a computer, said holding tool holding said at least one article during transfer thereof at a holding surface in a manner subjecting said at least one article to tear away from said holder tool due to inertial forces acting on said at least one article during transfer thereof, said at least one article having dimensions and a weight that produce a center a gravity of said at least one article that substantially coincides with a geometric center of the article, said method comprising the steps of:

for said at least one article, storing said weight and dimensions in a databank;

prior to transferring said at least one article to be transferred, accessing, by said computer, the weight and dimensions thereof from said databank and, in said computer, automatically calculating said geometric center, as the center of gravity, of said at least one article to be transferred;

giving said computer access to said starting point and said end point for said at least one article to be transferred;

in said computer, automatically calculating a transfer path, as a predetermined transfer path, for said at least one article to be transferred with respect to multiple axes of said multi-axis robot, dependent on said starting point and said end point and said center of gravity of said at least one article to be transferred, that causes said inertial forces acting on said at least one article to be transferred during transfer thereof to be confined substantially to normal forces acting orthogonally to said holding surface; and picking up said at least one article to be transferred at said starting point with said holding tool and transferring said at least one article to be transferred from said starting point to said end point with said multi-axis robot along said predetermined transfer path and precluding tear away of said at least one article to be transferred from said holding tool exclusively by adherence to said pre-determined transfer path.

2. A method as claimed in claim 1 comprising employing a multi-axis robot at which said holding tool is freely movably mounted.

3. A method as claimed in claim 1 comprising holding said at least one article to be transferred to said holding tool by applying suction at said holding surface.

4. An arrangement for transferring at least one article from a starting point to an end point, said at least one article having dimensions and a weight that produce a center a gravity of said at least one article that substantially coincides with a geometric center of said at least one article, said arrangement comprising:

a multi-axis robot having a holding tool;

a computer that controls operation of said multi-axis robot;

said holding tool holding said at least one article during transfer thereof at a holding surface in a manner subjecting said at least one article to tear away from said holder tool due to inertial forces acting on said at least one article during transfer thereof;

a data bank that stores, for said at least one article, said weight and dimensions;

said computer, prior to transferring said at least one article to be transferred, accessing the weight and dimensions thereof from said databank, and said computer automatically calculating said geometric center, as the center of gravity, of said at least one article to be transferred;

an interface allowing said starting point and said end point to be accessed by said computer for said at least one article to be transferred;

said computer automatically calculating a transfer path, as a predetermined transfer path, for said at least one article to be transferred with respect to multiple axes of said multi-axis robot, dependent on said starting point and said end point and said center of gravity of said at least one article to be transferred, that causes said inertial forces acting on said at least one article to be transferred during transfer thereof to be confined substantially to normal forces acting orthogonally to said holding surface; and said multi-axis robot picking up said at least one article to be transferred at said starting point with said holding tool and transferring said at least one article to be transferred from said starting point to said end point along said predetermined transfer path and precluding tear away of said at least one article to be transferred from said holding tool exclusively by adherence to said pre-determined transfer path.

5. A arrangement as claimed in claim 4 wherein said multi-axis robot comprises a hand having a free end at which said gripping tool is mounted, and a freely movable joint attaching said gripping tool at said free end of said hand.

6. An arrangement as claimed in claim 5 wherein said freely movable joint is selected from the group consisting of a ball joint and Cardan joint.

7. An arrangement as claimed in claim 5 wherein said freely movable joint comprises a cable connection.

8. An arrangement as claimed in claim 7 wherein said cable connection is at least partially elastic.

9. An arrangement as claimed in claim 5 wherein said freely movable joint comprises at least one damping element that damps movement of said freely movable joint.

* * * * *